Nov. 24, 1931.  J. S. STULL  1,833,662
APPARATUS FOR HANDLING ARTICLES
Filed Aug. 3, 1929  4 Sheets-Sheet 1

Inventor:
John S. Stull
By H. L. Patterson
Atty

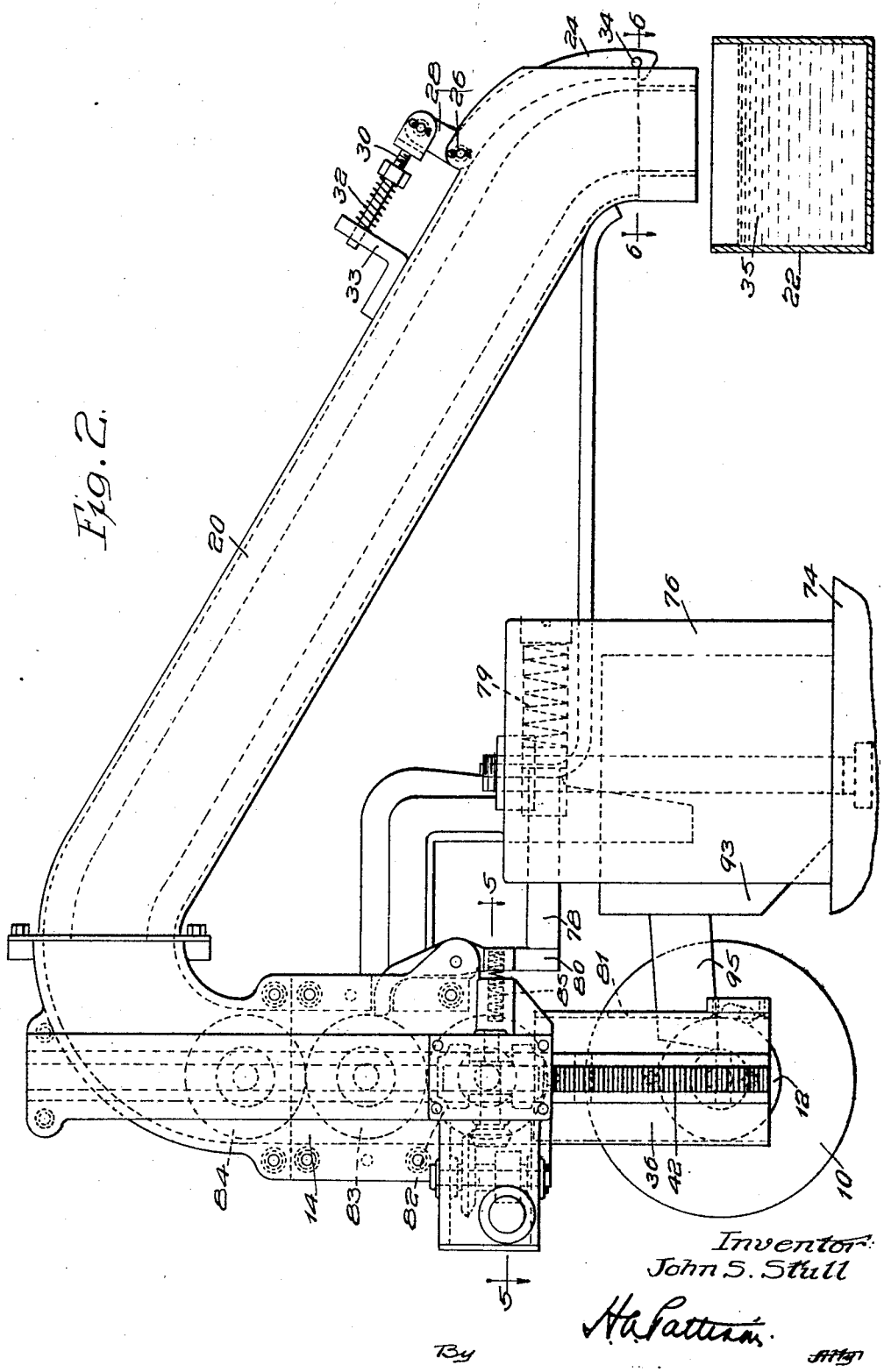

Nov. 24, 1931.    J. S. STULL    1,833,662
APPARATUS FOR HANDLING ARTICLES
Filed Aug. 3, 1929    4 Sheets-Sheet 3

Inventor,
John S. Stull

Nov. 24, 1931.    J. S. STULL    1,833,662
APPARATUS FOR HANDLING ARTICLES
Filed Aug. 3, 1929    4 Sheets-Sheet 4

Inventor
John S Stull
By H. L. Pattison
Atty

Patented Nov. 24, 1931

1,833,662

UNITED STATES PATENT OFFICE

JOHN S. STULL, OF CHICAGO, ILLINOIS, ASSIGNOR TO WESTERN ELECTRIC COMPANY, INCORPORATED, OF NEW YORK, N. Y., A CORPORATION OF NEW YORK

APPARATUS FOR HANDLING ARTICLES

Application filed August 3, 1929. Serial No. 383,385.

This invention relates to apparatus for handling articles, and more particularly to a transfer attachment for automatic machines designed to produce piece parts.

The invention is particularly applicable to automatic screw machines wherein successive forming operations are performed on a blank or bar of stock to produce piece parts of predetermined shape and dimensions.

An object of the invention is to provide an apparatus for rapidly and automatically removing the finished parts individually as they are produced by the machine, and for conveying them without injury to a place of storage.

In one embodiment of the invention, the attachment is applied to an automatic screw machine wherein a bar of stock is constantly rotated about its longitudinal axis and a plurality of tools operate on the end of the bar to form thereof a telephone transmitter electrode. Just before the finished electrode is severed from the bar, it is seized by a reciprocating receiving member which is actuated after the electrode is severed from the bar to transfer the electrode to an inclined chute through which it passes by gravity, its velocity being retarded by a yielding retarding member, to a suitable receptacle where a plurality of electrodes are stored until they are removed by the operator for assembly into transmitters. Alternatively, the electrodes may be allowed to accumulate in the chute, and may be periodically removed by the operator.

The invention will be more fully understood from the following description taken in connection with the appended drawings, in which Fig. 1 is a plan view of an apparatus embodying the invention as applied to a well known type of automatic screw machine;

Fig. 2 is an elevational view thereof;

Referring more particularly to the drawings, the attachment illustrated therein is designed to be applied to an automatic screw machine of the well known type wherein a plurality of tools are mounted on a turret for rotation in a vertical plane, to be successively indexed into operative relation with a work holding spindle which is mounted for rotation about a fixed axis.

The spindle is indicated at 10, (Fig. 2) and has a bar of stock fixed therein to rotate with the spindle about its own longitudinal axis, the end of the bar of stock being shown as formed into a telephone transmitter electrode 12 which is completely formed but not yet severed from the bar of stock.

Figure 3:
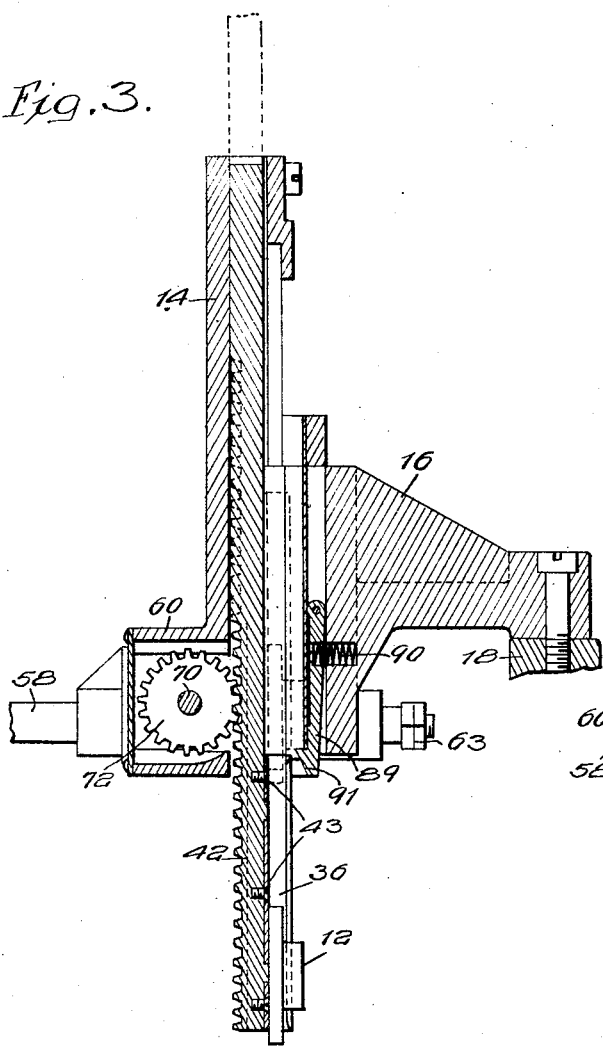
Fig. 3 is a sectional view taken on line 3—3 of Fig. 1.

Extending vertically above the electrode 12 is the body portion 14 of the attachment, which is held in position by a bracket 16 (Fig. 3) secured to the frame 18 of the machine. The interior of portion 14 is formed into a vertical passageway 15 shaped to receive the electrodes as they are formed. At its upper end the passageway is joined to an inclined chute 20 which terminates adjacent a receptacle 22 adapted to contain the electrodes deposited therein by the chute 20 until such time as the operator can remove them and place them in suitable containers. In order to prevent the electrodes from being dropped at too great a velocity into the receptacle and thereby become damaged, a retarding lever 24 is pivoted to the chute and extends through a slot into the path of the moving electrodes. The lever is pivoted at 26 and has an arm 28 extending outwardly from the chute. A threaded pin 30 is pivoted to the arm and carries an adjustable coiled spring 32 which bears against an apertured stop 33 through which the pin passes. The movement of the lever into the path of the electrodes passing through the chute 20 is limited by a stop pin 34 seated in the lever and bearing against the opposite walls of the chute. In order further to decrease the likelihood of damage to the electrodes, the receptacle 22 may be filled with a liquid 35 such as oil. As an alternative, the spring 32 may be so adjusted that an electrode passing through the chute 20 will not actuate the lever 24, whereupon the electrodes will accumulate in the chute until the operator removes them by manually releasing the lever. Where this method of operation is employed, the chute may be made of sufficient length to contain any desired number of electrodes, and the spring 32 will function as a safety device to permit an electrode to be forced out of the chute when the chute is completely filled and the receiving mechanism, described below, is actuated to introduce another electrode into the chute.

Figure 4:
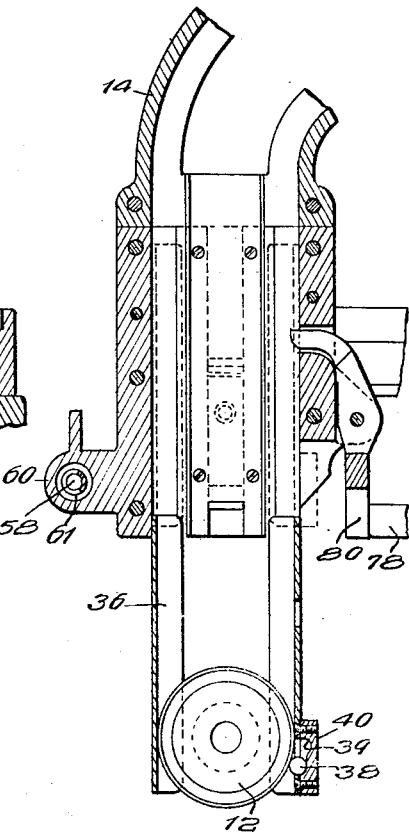
Fig. 4 is a sectional view taken on the line 4—4 of Fig. 1.
Figure 5:
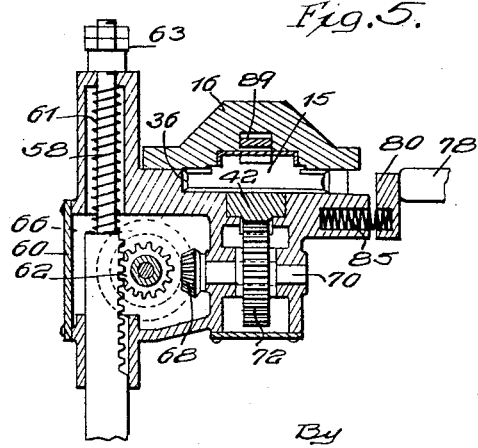
Fig. 5 is a sectional view taken on the line 5—5 of Fig. 2.

A receiving member 36 is reciprocably mounted in operative relation to the electrode 12 and is shaped to fit over the same before it is severed from the bar of stock, the rear of the receiving member being open as shown in Fig. 5 to permit the hub of the electrode to project therethrough. Member 36 is provided with a retaining ball 38 (Fig. 4) seated in an inclined slot 39 formed in a boss 40 fixed to the member 36. The ball rides upwardly into the deeper portion of the slot when the member 36 is lowered over the electrode, thus permitting the electrode to be inserted, and rides downwardly into the shallower portion of the slot when member 36 is raised, thus preventing the electrode from dropping from the member.

Figure 9:
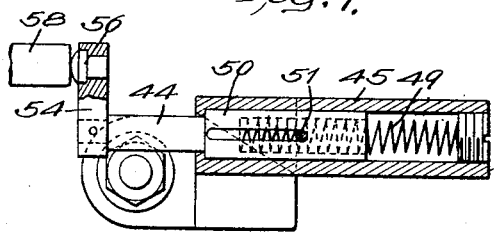
Fig. 9 is a sectional view taken on the line 9—9 of Fig. 8.
Figure 8:
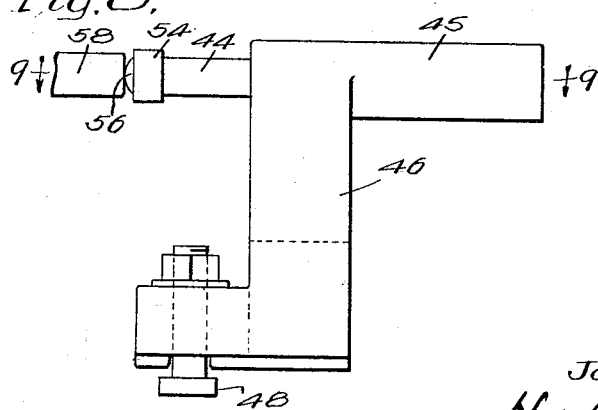
Fig. 8 is a fragmentary elevational view of an actuating member.

The receiving member 36 is vertically reciprocated by means of a vertical rack 42, secured thereto by screws 43 (Fig. 3) and slidably mounted in the body 14. The mechanism for reciprocating the rack includes a drive pin 44 (Fig. 9) which is slidably mounted in a sleeve 45 fixed to a bracket 46 which is secured by means of a bolt 48 to the turret of the machine. The pin 44 is yieldingly held in its forward position by a coiled spring 49 which seats in a piston 50 formed integral with the pin, the piston being engaged by pins 51 extending from the sleeve 45 into slots formed in the piston to prevent the latter from rotating.

Figure 7:
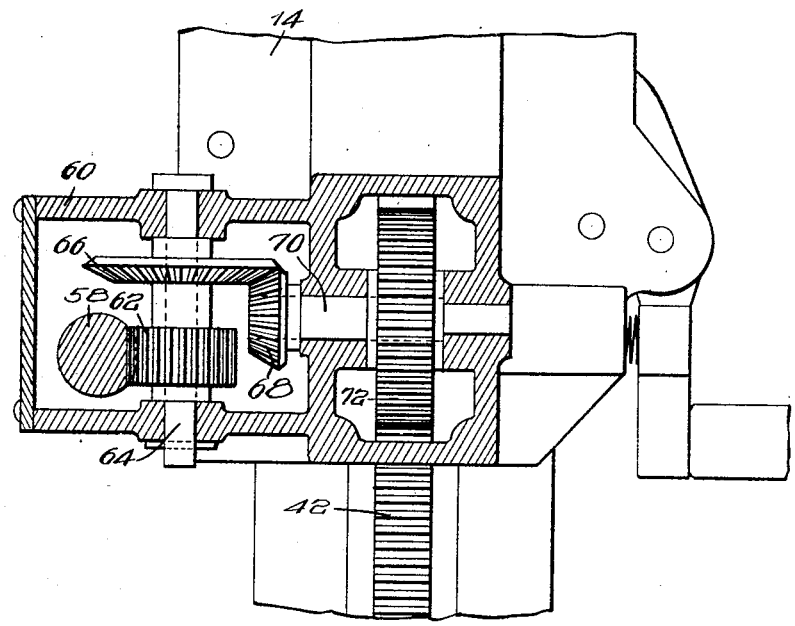
Fig. 7 is a sectional view taken on the line 7—7 of Fig. 1.

At the forward end of the drive pin 44 a cross piece 54 is attached, having at its end a button 56 designed to contact with and actuate a horizontal rack 58. Rack 58 is slidably mounted in a housing 60 (Figs. 3 and 7) which is secured to the body 14, and the rack is urged forwardly by a coiled spring 61 which surrounds the reduced forward end of the rack and carries an adjustable stop member 63. Rack 58 engages a pinion 62 which is mounted on a stud shaft 64 and is formed integral with a bevel gear 66. The gear 66 engages a second bevel gear 68 which is fixed to a shaft 70 having fixed thereto a gear 72 which engages the rack 42 to raise it and the member 36 vertically to the position indicated in dotted lines in Figs. 3 and 4, the member 36 sliding within the body 14 in telescoping relation during this operation. The gear ratio of the parts just described is so proportioned to the rate of advance of the bracket 46 that the member 36 will be quickly raised as soon as the severing operation is completed, since any delay in this action adds to the total time required to produce an electrode.

Figures 1, 6:
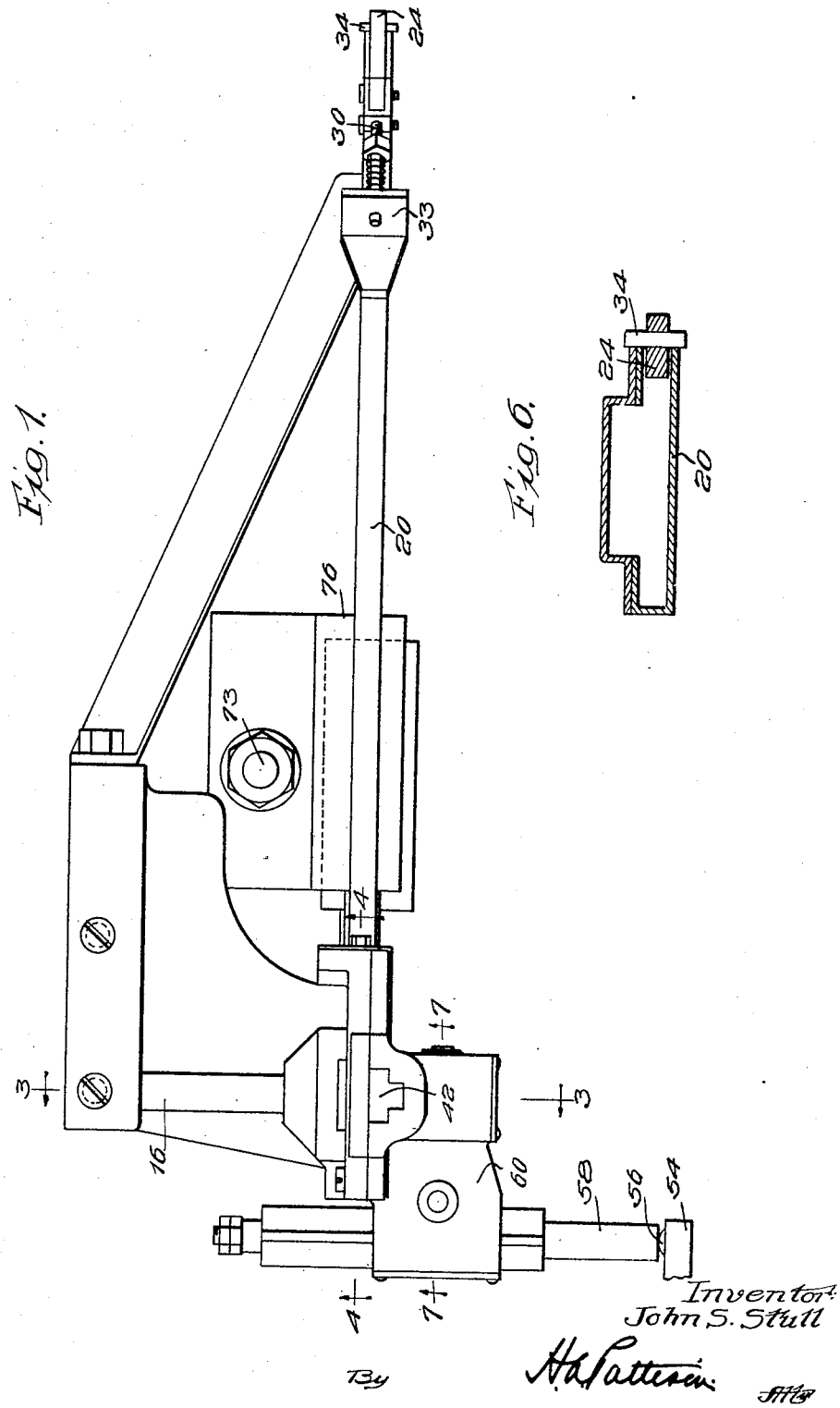
Fig. 6 is a sectional view taken on the line 6—6 of Fig. 2.

Attached by a bolt 73 to a transversely movable cross slide 74 on the machine is a block 76 (Figs. 1 and 2) which carries a driving pin 78 yieldingly held in position by an adjustable coiled spring 79. The pin is designed to actuate periodically the lower end of a detent 80 which is pivoted to the wall of passageway 15. The upper end of the detent has a portion which projects inwardly through the wall of the passageway and serves to engage an aperture 81 formed in the wall of the receiving member 36 to retain it in its raised position until the detent is moved to inoperative position by the pin 78, whereupon member 36 drops quickly to its lower position by gravity. The detent is yieldingly held in its operative position by a spring 85 seated between the lower end of the detent and the body 14.

A retaining member 89 (Fig. 3) has one of its ends pivoted to the bracket 16 and its other end is yieldingly urged toward the passageway 15 by a spring 90. The free end 91 of the member 89 is formed into a hook for engaging the lower edge of the hub portion of an electrode, and the lower surface of the hook is formed with a cam surface whereby an upwardly moving electrode may move the member 89 out of its path.

Mounted on the slide 74 at the rear of the block 76 is a tool holding block 93 (Fig. 2) which supports a cutting tool 95 designed to sever the electrode 12 from the bar of stock from which it has been formed.

In operation, the bar of stock is rotated by the spindle 10 and its end is formed in the known manner into the shape of electrode 12. The cross slide 74 is then actuated by any suitable known manner (not shown) to bring the tool 95 into operative relation to the electrode 12 to sever it from the bar of stock. Before the severing operation is complete, the cross slide 74 is moved to the left, as viewed in Figs. 1 and 2, through a sufficient distance to cause the pin 78 to actuate the detent 80. The detent thereupon releases the member 36, which has been in the raised position, allowing it to drop to the position shown in Fig. 2, where it encloses the electrode 12 without interfering with the operation of tool 95. When the electrode is severed from the bar of stock, the turret is moved forward by known means forming a part of the known automatic screw machines, thus actuating the bracket 46 and raising the rack 42 and the member 36, the latter carrying with it the electrode 12 which is held in position within the member 36 by the ball 38. As the member 36 moves upwardly it causes the previously formed electrodes 82, 83, and 84, positioned in the chute 14 above the retaining member 89, to move upwardly, and the upper electrode 84 passes into the inclined chute 20 through which it passes by gravity to the receptacle 22, its velocity being retarded or entirely arrested by the action of the retarding lever 24 as above explained. The receiving member 36 remains in its raised position until another electrode is about to be severed by tool 86, whereupon driving pin 78 actuates the detent 80, allowing the receiving member to fall by gravity to its receiving position, leaving the electrode 12 retained in raised position by the member 89, and the cycle just described is repeated.

While the invention has been described with reference to a particular embodiment thereof, it will be understood that it may be embodied in various forms, and that it is limited only by the terms of the appended claims.

What is claimed is:

1. In a forming mechanism, a receiving member for articles being formed, means for raising the receiving member from a receiving position to a delivery position, means for retaining the articles in raised position, and means operative after a predetermined interval to release the receiving member to allow it to fall to receiving position.

2. In a forming mechanism wherein articles are successively formed and severed from a bar of stock, a receiving member adapted to seize an unsevered article, means operative after the article has been severed to raise the receiving member and article to a delivery position, and means movable into the path of the article to retain it in raised position independently of the receiving member.

3. In a forming mechanism wherein articles are successively formed and severed from a bar of stock, a receiving member adapted to seize an unsevered article, means operative after the article has been severed to raise the receiving member and article to a delivery position, means movable into the path of the article to retain it in raised position independently of the receiving member, and means operative after a predetermined interval to release the receiving member to allow it to fall to receiving position.

4. In a forming mechanism, a reciprocable receiving member for articles being formed, means for periodically reciprocating the receiving member, a chute for receiving the articles from the receiving member, and releasable means for arresting the movement of the articles through the chute.

5. In a forming mechanism, a reciprocable receiving member for articles being formed, a chute, means for reciprocating the receiving member to cause it to transfer articles to the chute, and manually releasable means for arresting the movement of the articles through the chute.

6. A transfer attachment for a forming mechanism, comprising a receiving member adapted to be moved to a receiving position to engage an article, a member positioned to receive articles from the receiving member, and means preventing movement of the engaged articles relative to the receiving member in one direction while permitting movement thereof in another direction.

7. A transfer attachment for a forming mechanism, comprising a receiving member adapted to be moved to a receiving position to engage an article, means preventing movement of the engaged articles relative to the receiving member in one direction while permitting movement thereof in another direction, and releasable means for preventing the receiving member from being moved to its receiving position.

8. A transfer attachment for a forming mechanism, comprising a downwardly inclined chute adapted to contain a plurality of articles, positive means for introducing articles in the upper end of the chute, and means positioned at the lower end of the chute to retard the movement of the articles through the chute, said retarding means being adjustable to normally arrest the movement of the articles through the chute.

9. A transfer attachment for a forming mechanism, comprising a receiving member for articles being formed, the receiving member being provided with a passageway for the articles, an extension formed on the receiving member and provided with an inclined slot, and a member movably seated in the slot to permit movement of an article relative to the receiving member in one direction and to prevent movement of the article in the other direction.

10. In a forming mechanism wherein articles are successively formed and severed from a bar of stock, means operative after the article has been severed for raising the article to a delivery position, means for retaining the article in raised position independently of the receiving member, a latch for retaining the article receiving member in raised position, and means operative after a predetermined interval to release the latch member allowing the receiving member to fall to receiving position thereby to seize the partly formed article.

11. A transfer attachment for a forming mechanism, comprising a receiving member for articles being formed, the receiving member being provided with a passageway for the articles, means for preventing movement of the articles in the passageway in one direction, an extension formed on the receiving member and provided with an inclined slot, and a member movably seated in the slot to permit movement of an article relative to the receiving member in one direction and to prevent movement of the article in the other direction.

In witness whereof, I hereunto subscribe my name this 24th day of July, A. D. 1929.

JOHN S. STULL.